(12) United States Patent
Cavanaugh et al.

(10) Patent No.: US 9,670,984 B2
(45) Date of Patent: Jun. 6, 2017

(54) METHOD FOR REMANUFACTURING FLYWHEEL

(71) Applicant: Caterpillar Inc., Peoria, IL (US)

(72) Inventors: Daniel T. Cavanaugh, Chillicothe, IL (US); Curtis J. Graham, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 14/589,060

(22) Filed: Jan. 5, 2015

(65) Prior Publication Data
US 2016/0195163 A1 Jul. 7, 2016

(51) Int. Cl.
*F16F 15/30* (2006.01)
*F02F 7/00* (2006.01)
*F16D 1/076* (2006.01)
*B23P 6/00* (2006.01)

(52) U.S. Cl.
CPC ............. *F16F 15/30* (2013.01); *B23P 6/00* (2013.01); *F02F 7/0043* (2013.01); *F16D 1/076* (2013.01)

(58) Field of Classification Search
CPC . F16F 15/30; B23P 6/00; F02F 7/0043; F16D 1/076
USPC ......... 123/197.5; 29/402.01, 402.06; 74/572, 74/573, 574, 433.5, 64
See application file for complete search history.

(56) References Cited

U.S. PATENT DOCUMENTS

| | | | | |
|---|---|---|---|---|
| 5,111,570 A | * | 5/1992 | Baumgarten | B21K 25/00 228/119 |
| 5,140,737 A | * | 8/1992 | Noland | B23K 9/04 29/402.13 |
| 5,216,798 A | * | 6/1993 | Sterling | B23P 11/025 29/445 |
| 5,233,744 A | | 8/1993 | Noland | |
| 6,370,752 B1 | | 4/2002 | Anderson et al. | |
| 6,508,000 B2 | | 1/2003 | Burke et al. | |
| 6,793,057 B1 | * | 9/2004 | Smith, Jr. | F16D 13/70 192/107 M |
| 7,810,237 B2 | * | 10/2010 | Lange | B23P 6/005 29/402.09 |
| 8,091,199 B2 | | 1/2012 | Goodwin | |
| 8,539,659 B2 | * | 9/2013 | Szela | B24B 39/06 29/402.09 |
| 8,689,762 B2 | | 4/2014 | Bach et al. | |
| 2005/0091847 A1 | * | 5/2005 | Beneteau | B23P 6/007 29/889.1 |

(Continued)

FOREIGN PATENT DOCUMENTS

| | | |
|---|---|---|
| CN | 202484193 | 10/2012 |
| CN | 104162761 | 11/2014 |
| GB | 2501604 | 1/2003 |

*Primary Examiner* — Grant Moubry
(74) *Attorney, Agent, or Firm* — Law Office of Kurt J. Fugman LLC

(57) ABSTRACT

A method for remanufacturing of a flywheel is provided. The flywheel has a damage area thereon. The method includes removing a portion of a material from a face of the flywheel containing the damage area to form a recessed portion, wherein the recessed portion has a ring shaped profile. The method also includes aligning an insert within the recessed portion of the flywheel, wherein the insert is ring shaped and is configured to fit within the recessed portion of the flywheel. The method further includes coupling the insert within the recessed portion of the flywheel.

10 Claims, 6 Drawing Sheets

(56) References Cited

U.S. PATENT DOCUMENTS

2007/0164087 A1    7/2007   Payne
2008/0086862 A1    4/2008   Da Mota Pavan
2012/0152048 A1    6/2012   Petry-Johnson et al.
2012/0291589 A1*   11/2012   Jayakar .................. F16F 15/31
                                                                  74/573.1

* cited by examiner

METHOD FOR REMANUFACTURING FLYWHEEL

TECHNICAL FIELD

The present disclosure relates to a system and method for remanufacturing of engine components, and more particularly to the method for remanufacturing of a flywheel of an engine system.

BACKGROUND

Flywheels associated with an engine of a machine interfaces with a clutch plate of a clutch assembly during engine operation. Over a period of time, a surface of the flywheel may wear out due to frictional contact with the clutch plate, and may sometimes cause an increase in a gap formed between the flywheel and the clutch plate, resulting in slipping therebetween. These flywheels may need to be salvaged or replaced in order to restore normal working conditions thereof.

U.S. Pat. No. 6,370,752 describes a method for repositioning or repairing holes in metal substrates such as metal components used in jet engines and the like. The hole to be repositioned or repaired is enlarged and a recess is formed at each end of the enlarged hole. A deformable metal insert is then inserted within the enlarged hole and then subjected to physical forces so as to cause it to deform and frictionally engage the walls of the recesses and the enlarged hole so that the insert becomes axially fixed therein. A new, repositioned hole can then be formed in the fixed insert that extends completely therethrough.

SUMMARY OF THE DISCLOSURE

In one aspect of the present disclosure, a method for remanufacturing of a flywheel is provided. The flywheel has a damage area thereon. The method includes removing a portion of a material from a face of the flywheel containing the damage area to form a recessed portion, wherein the recessed portion has a ring shaped profile. The method also includes aligning an insert within the recessed portion of the flywheel, wherein the insert is ring shaped and is configured to fit within the recessed portion of the flywheel. The method further includes coupling the insert within the recessed portion of the flywheel.

In another aspect of the present disclosure, a flywheel is provided. The flywheel includes a front face configured to contact with a clutch plate. The flywheel also includes a rear face spaced from and generally coplanar with the front face. The front and rear faces define a thickness of the flywheel therebetween. The rear face is spaced from and generally coplanar with the front face. The flywheel further includes at least one remanufactured surface formed on at least one of the front face or the rear face of the flywheel. The at least one remanufactured surface has a planar configuration. The at least one remanufactured surface includes an insert coupled within a recessed portion formed on the at least one of the front face or the rear face of the flywheel. The recessed portion is formed having a ring shaped profile corresponding to a removed portion of a material of the flywheel containing a damage area.

In yet another aspect of the present disclosure, an engine system is provided. The engine system includes an engine block. The engine system also includes a crankshaft. The engine system further includes a clutch plate. The engine system includes a gear member. The engine system also includes a flywheel. The flywheel includes a front face contacting with the clutch plate. The flywheel also includes a rear face, the front and rear faces define a thickness of the flywheel therebetween. The flywheel further includes at least one remanufactured surface formed on at least one of the front face or the rear face of the flywheel. The at least one remanufactured surface has a planar configuration. The at least one remanufactured surface includes an insert coupled within a recessed portion formed on the at least one of the front face or the rear face of the flywheel. The recessed portion is formed having a ring shaped profile corresponding to a removed portion of a material of the flywheel containing a damage area.

Other features and aspects of this disclosure will be apparent from the following description and the accompanying drawings.

DETAILED DESCRIPTION

Figure 1:
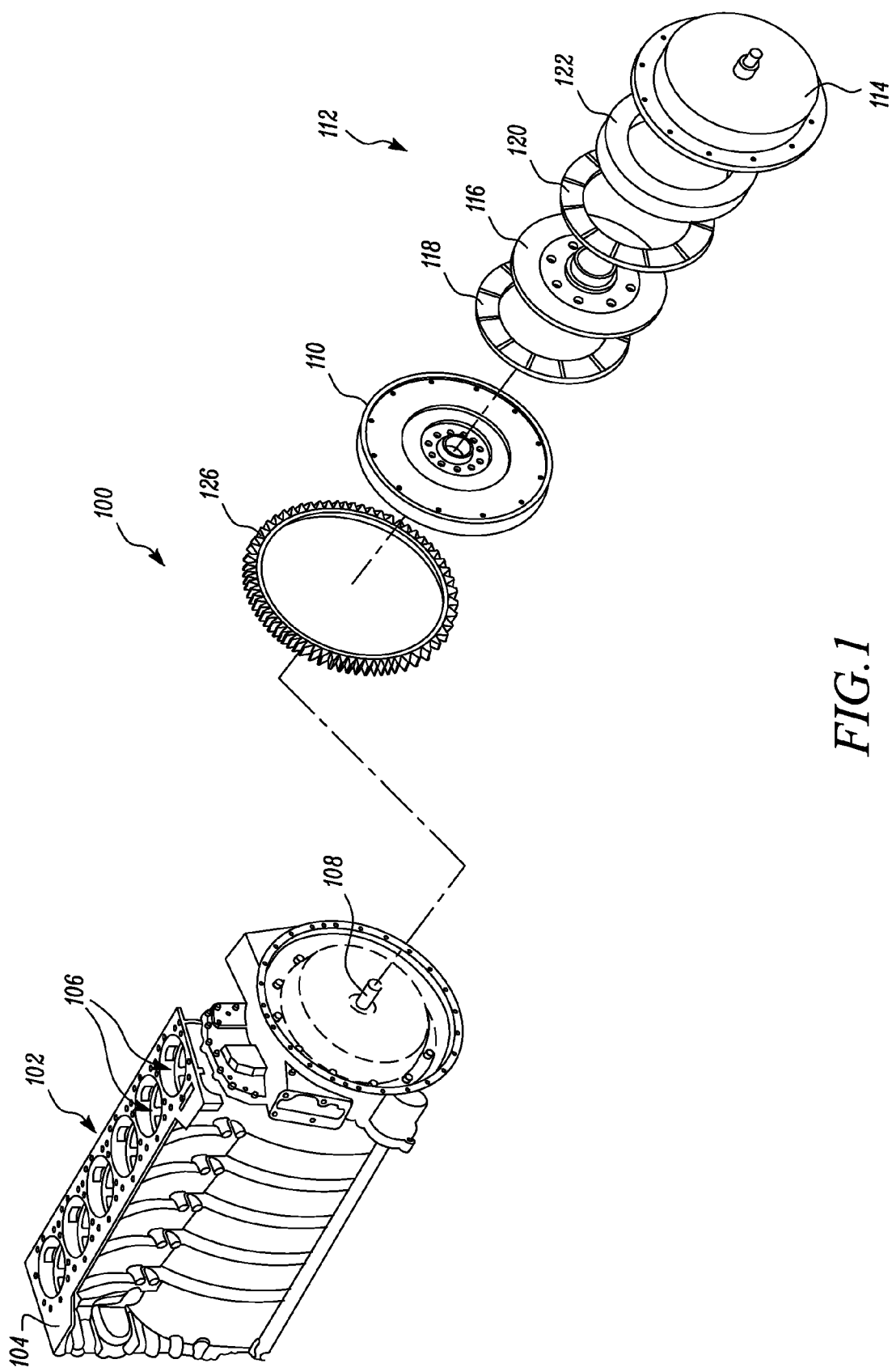
FIG. 1 is an exploded perspective view of an exemplary engine system having an engine and a flywheel associated therewith, according to one embodiment of the present disclosure.

Wherever possible, the same reference numbers will be used throughout the drawings to refer to the same or the like parts. Referring now to FIG. 1, an exemplary engine system 100 is illustrated. The engine system 100 may be configured to power a machine (not shown), for example, a track type tractor, a backhoe loader, a skid steer loader, a wheel loader, a motor grader, an excavator, and the like. It should be understood that the machine may embody any wheeled or tracked machine associated with mining, agriculture, forestry, construction, and other industrial applications.

In one embodiment, the engine system 100 may include an engine 102, for example, a diesel engine, a gasoline engine, a gaseous fuel powered engine, such as, a natural gas engine, a combination of known sources of power, or any other type of engine apparent to one of skill in the art. In the illustrated embodiment, the engine 102 includes a multi cylinder internal combustion engine. The engine 102 may be powered by any one or a combination of known liquid or gaseous fuels including, but not limited to, gasoline, diesel, natural gas, petroleum gas, and bio-fuels. The machine may include a transmission system and a propulsion system. The transmission system may be communicably coupled to the engine system 100. The transmission system may include coupling elements for transmitting a drive torque from the engine 102 to the propulsion system. The propulsion system may include tracks or wheels configured to propel the machine on ground.

The engine 102 may include a cylinder head (not shown) and an engine block 104. The engine block 104 may include a plurality of cylinders 106. Each of the plurality of the cylinders 106 may be configured to house a piston (not shown). The piston may be configured to have a translatory movement within the cylinder 106. The piston may be coupled to a connecting rod (not shown). Further, the connecting rod may be coupled to a crankshaft 108. The connecting rod may be configured to convert the translatory movement of the piston to a rotary movement of the crankshaft 108.

The engine system 100 includes a flywheel 110 associated therewith. The flywheel 110 is mounted on the crankshaft 108. The flywheel 110 is configured to store rotational energy and maintain a near constant angular velocity of the crankshaft 108. Further, the engine system 100 includes a clutch assembly 112. The clutch assembly 112 is configured to engage or disengage the engine system 100 and the transmission system. During an engagement of the clutch assembly 112 with the flywheel 110, driving power is transmitted from the crankshaft 108 to the transmission system.

An exploded view of the clutch assembly 112 is illustrated in FIG. 1. The clutch assembly 112 includes a clutch housing 114. The clutch assembly 112 also includes a clutch plate 116. The clutch assembly 112 is configured to be in selective contact with the flywheel 110, based on an operational state of the machine. The clutch assembly 112 includes a pair of friction discs 118, 120 provided on either sides of the clutch plate 116. In an assembled condition, the friction discs 118, 120 are coupled to the clutch plate 116.

The clutch assembly 112 includes a pressure plate 122. The clutch assembly 112 further includes a spring (not shown). During an engagement of the engine system 100 and the transmission system, the spring pushes the pressure plate 122 against the clutch plate 116, which in turn presses against the flywheel 110. This locks the engine system 100 to the transmission system, causing these systems to spin at the same speed. The clutch plate 116, the pressure plate 122, and springs are enclosed within the clutch housing 114 of the clutch assembly 112. The clutch housing 114 may be attached to a face of the engine block 104 using mechanical fasteners.

Figure 2:
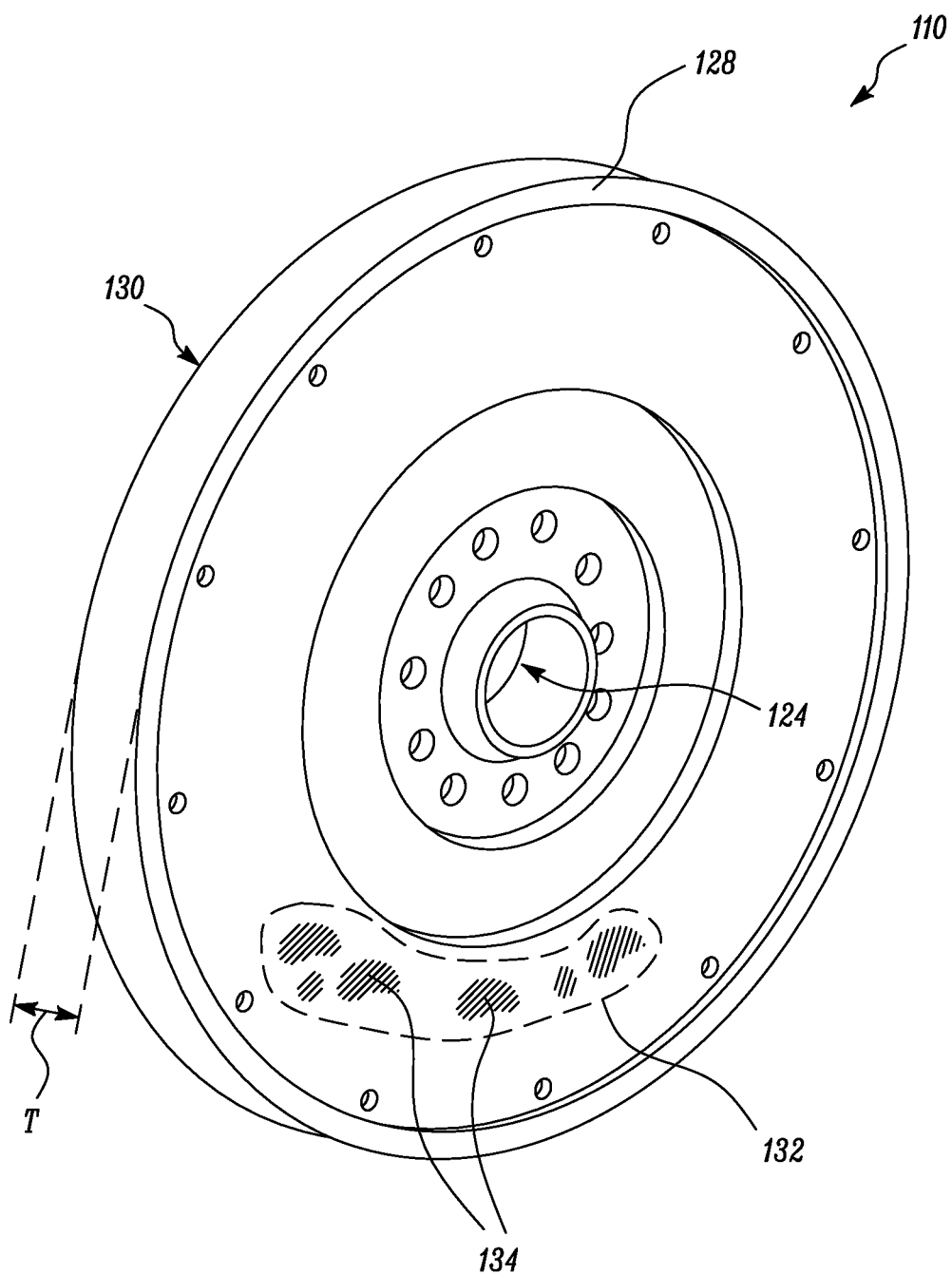
FIG. 2 is a perspective view of the flywheel having a damaged area, according to one embodiment of the present disclosure.
Figure 3:
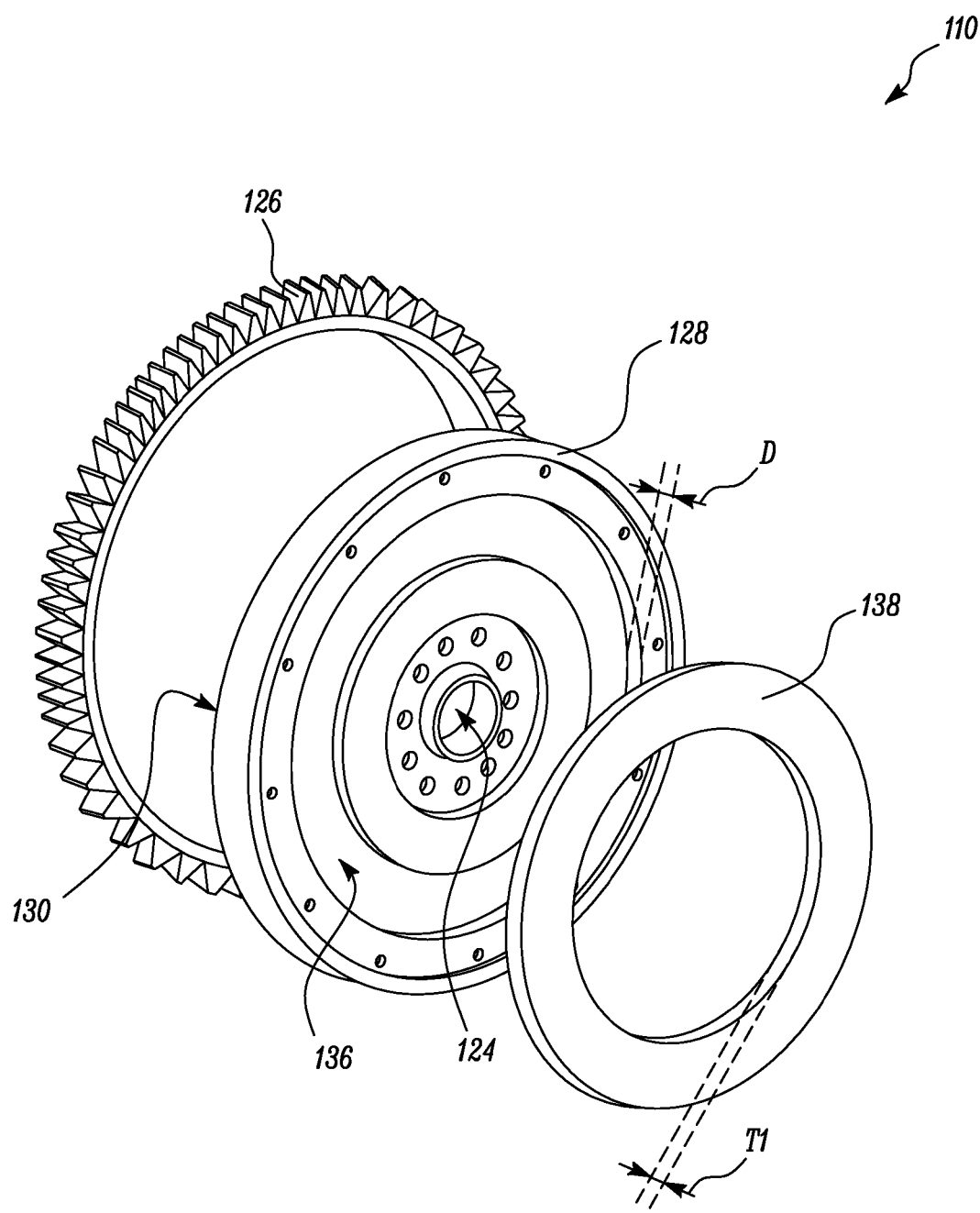
FIG. 3 is an exploded perspective view of the flywheel having a recessed portion and an insert associated with the flywheel.

Referring to FIGS. 1 and 2, the flywheel 110 is disc shaped and has a through bore 124 at a central part thereof. The through bore 124 of the flywheel 110 is configured to receive the crankshaft 108. As shown in FIGS. 1 and 3, the flywheel 110 includes a gear member or a ring gear 126 provided around an outer periphery thereof. The flywheel 110 may be made from metal or its alloys, ceramics, polymers, and the like. In one example, the flywheel 110 may be made of cast iron.

Referring to FIGS. 2 to 5, the flywheel 110 includes a front face 128. The front face 128 of the flywheel 110 is configured to contact with the clutch plate 116, through the friction disc 118. The flywheel 110 includes a rear face 130. The front and rear faces 128, 130 of the flywheel 110 are embodied as planar surfaces and define a thickness "T" (see FIG. 2) of the flywheel 110 therebetween.

During engine operation, the front face 128 of the flywheel 110 may experience wear and tear due to contact of the front face 128 with the clutch plate 116. In some situations, a damage area 132 may be formed on the front face 128 of the flywheel 110. The damage area 132 having exemplary defects 134 are shown in FIG. 2. A person of ordinary skill in the art will appreciate that the damage area 132 and the defects 134 thereon are exemplary and do not limit the scope of the present disclosure. The location, size, and shape of the defects 134 may vary without any limitation.

The present disclosure contemplates removing a portion of the front face 128 of the flywheel 110 having the damage area 132. In one example, the portion surrounding the damage area 132 may be removed by a machining process. Further, as shown in FIG. 3, a recessed portion 136 is formed on the front face 128 of the flywheel 110. A depth "D" (see FIG. 3) of the recessed portion 136 may depend on a depth of the defects 134 that are formed in the damage area 132. Accordingly, the recessed portion 136 may be formed by removing the material on the front face 128 of the flywheel 110 that contains and surrounds the defects 134, in such a manner so as to form the recessed portion 136 having a uniform geometry. In the illustrated embodiment, the recessed portion 136 has a ring shaped profile.

Figure 4:
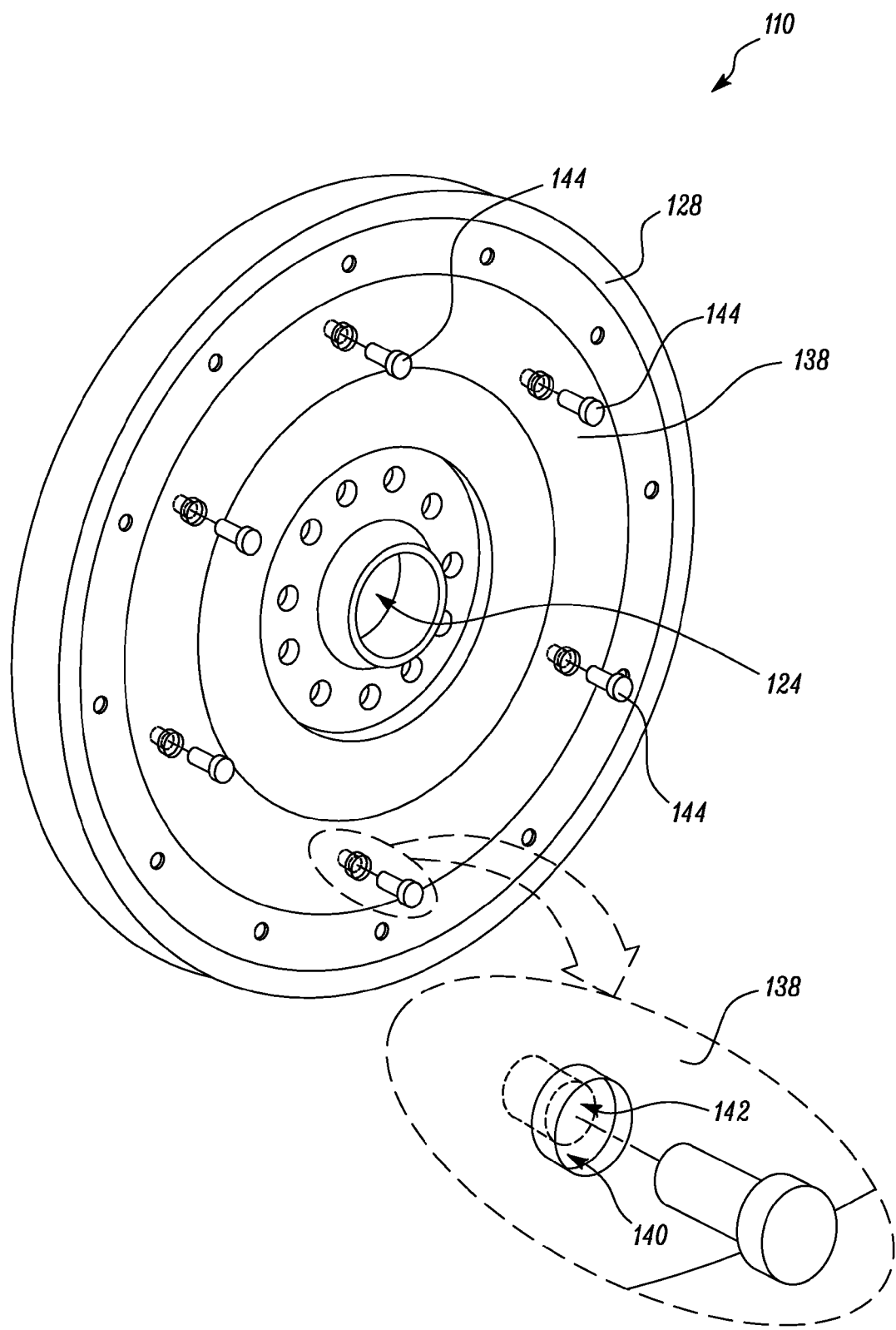
FIG. 4 is a perspective view of the flywheel with the insert provided within the recessed portion of the flywheel and mechanical fasteners for coupling thereof.
Figure 5:
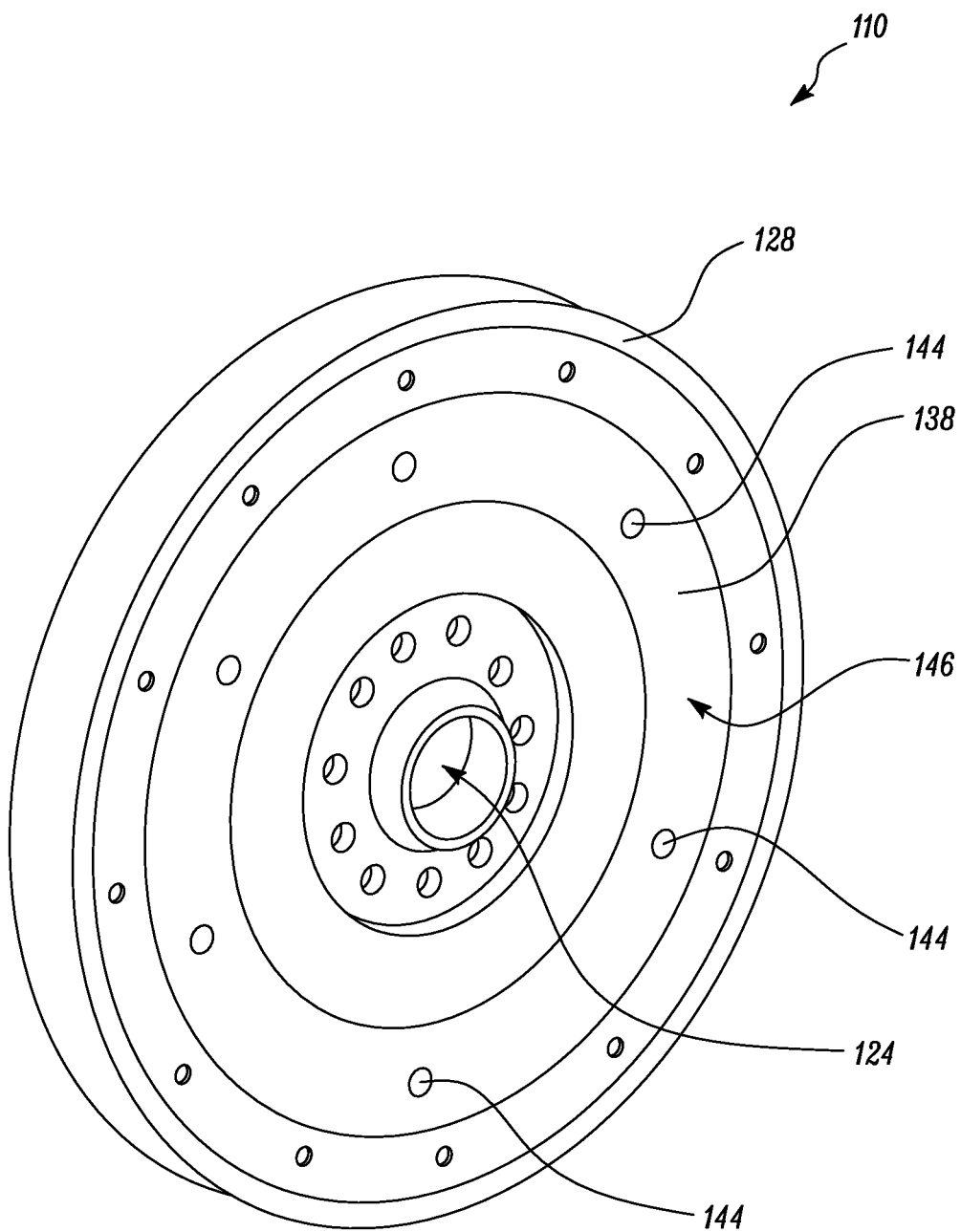
FIG. 5 is a perspective view of the remanufactured flywheel.
Figure 6:
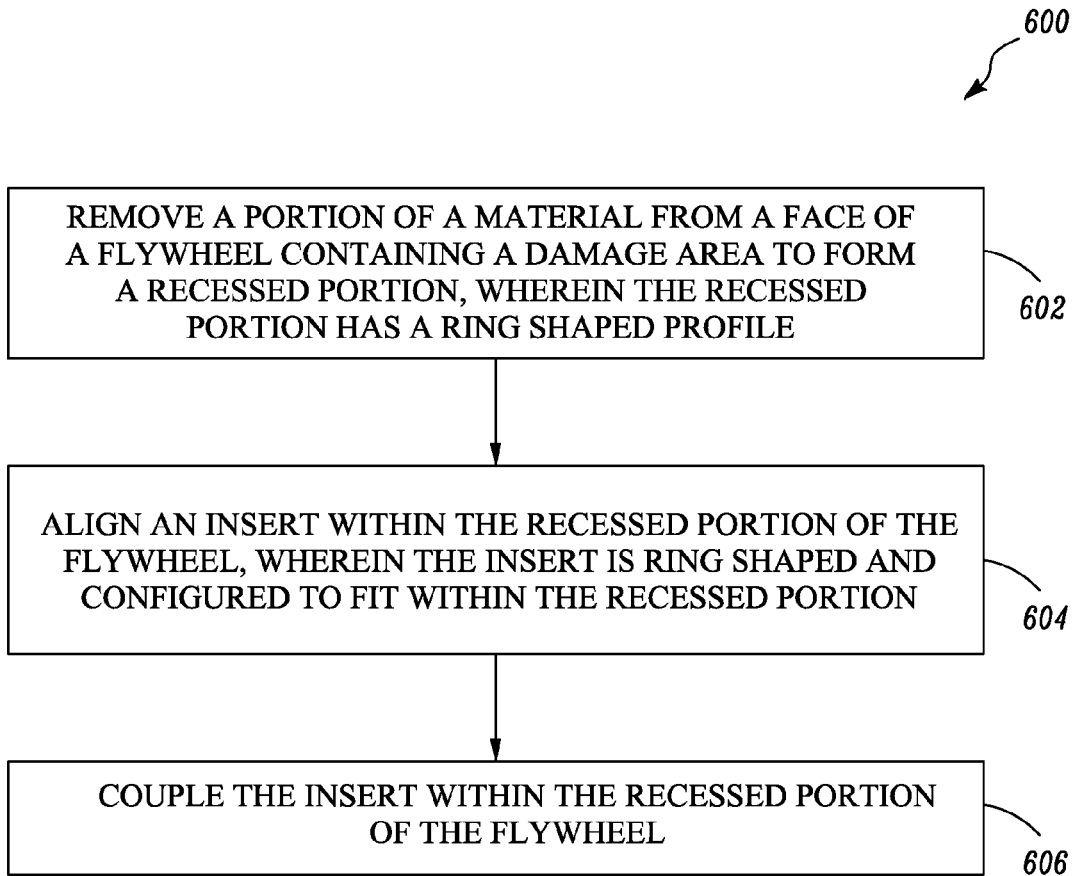
FIG. 6 is a flowchart for a method of remanufacturing the flywheel.

As shown in FIGS. 3 to 5, the recessed portion 136 of the flywheel 110 is configured to receive an insert 138. The insert 138 is aligned and provided within the recessed portion 136 of the flywheel 110 (see FIG. 3). The insert 138 may be press fitted within the recessed portion 136 of the flywheel 110. A shape of the insert 138 is based on the profile of the recessed portion 136. In the illustrated embodiment, the insert 138 is ring shaped. Further, a thickness "T1" (see FIG. 3) of the insert 138 may be greater than or equal to the depth "D" of the recessed portion 136. A diameter of the insert 138 may be based on a diameter of the recessed portion 136 of the flywheel 110.

The insert 138 may be made of a material that exhibits properties that are similar to the properties of the material of the flywheel 110. In one embodiment, the material of the insert 138 may be same as the material of the flywheel 110. In an alternate embodiment, the material of the insert 138 may be different from the material of the flywheel 110. For example, the insert 138 may be made of mild steel, cast iron, brass, stainless steel, alloy steel. The material used for manufacturing the insert 138 listed herein are non-limiting, and any metal or metal alloys that exhibit properties similar to the properties of the material of the flywheel 110 may be used to manufacture the insert 138.

After receiving or fitting the insert 138 within the recessed portion 136, the insert 138 may be coupled or fastened therewithin. As shown in FIG. 4, a number of co-aligned holes 140, 142 are provided through the insert 138 and the flywheel 110 respectively. The number of the co-aligned holes 140, 142 so formed may vary based on a size of the flywheel 110 and the insert 138. The co-aligned holes 140, 142 may be provided by any material removal process known in the art. In one example, the co-aligned holes 140, 142 may be formed by drilling or boring. In the illustrated embodiment, six pairs of co-aligned holes 140, 142 are provided through the insert 138 and the flywheel 110 respectively.

Referring now to FIGS. 4 and 5, each of the co-aligned holes 140, 142 of the insert 138 and the flywheel 110 respectively is configured to receive a mechanical fastener 144 therein. The mechanical fasteners 144 are configured to couple the insert 138 within the recessed portion 136 of the flywheel 110. The mechanical fasteners 144 may include any of a stud, bolt, screw, rivet, pin, and the like.

As discussed earlier, in some embodiments, the thickness "T1" of the insert 138 may be greater than the depth "D" of the recessed portion 136. In such cases, the insert 138 may project from the front face 128 of the flywheel 110 that is in surrounding contact with the insert 138. During engine operation, the projecting portion of the insert 138 may interfere with the clutch plate 116 and may cause wear of the parts in contact if not leveled. For this purpose, the insert 138 and the front face 128 of the flywheel 110 that surrounds the insert 138 are machined to form a coplanar relationship therebetween. Referring to FIG. 5, the machined surface of the insert 138 and the flywheel 110 together form a remanufactured surface 146 of the flywheel 110. It should be noted that the remanufactured surface 146 has a substantially planar configuration. The machining process may be performed using conventional material removal tools.

Although the present disclosure is explained in relation to the remanufacturing of the front face 128 of the flywheel 110, the above described remanufacturing procedure may also be used to remanufacture the rear face 130 of the flywheel 110, based on the presence of any damage areas thereon. Further, the flywheel 110 of the present disclosure may be used in applications other than engine systems.

INDUSTRIAL APPLICABILITY

The present disclosure relates to a method 600 of remanufacturing of the flywheel 110 having the damage area 132 thereon. At step 602, the front face 128 of the flywheel 110 is machined to remove the portion of the material from the front face 128 of the flywheel 110 containing the damage area 132 in order to form the recessed portion 136. The recessed portion 136 has a ring shaped profile.

At step 604, the insert 138 is aligned within the recessed portion 136 of the flywheel 110. The insert 138 is ring shaped and configured to fit within the recessed portion 136 of the flywheel 110. At step 606, the insert 138 is coupled within the recessed portion 136 of the flywheel 110.

Further, the co-aligned holes 140, 142 are formed through the insert 138 and the flywheel 110 respectively. The co-aligned holes 140, 142 are configured to receive the mechanical fasteners 144 therein, in order to couple the insert 138 with the flywheel 110. Further, after the insert 138 is coupled with the flywheel 110, the insert 138 and the front face 128 of the flywheel 110 that is in surrounding contact with the insert 138 are machined to form the coplanar relationship therebetween.

The method 600 of remanufacturing the flywheel 110 described herein provides a low cost solution for returning the dimensional and functional characteristics of a given flywheel back to a remanufactured condition. Further, the method 600 is easy to imply and may not require expensive labor. The method 600 does not require special tooling arrangements for the remanufacturing of the flywheel 110.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A flywheel comprising:
a front face configured to contact with a clutch plate;
a rear face spaced from and generally parallel with the front face, the front and rear faces defining a thickness of the flywheel therebetween, and
at least one remanufactured surface formed on at least one of the front face or the rear face of the flywheel, wherein the at least one remanufactured surface has a planar configuration, the at least one remanufactured surface including:
an insert coupled within a recessed portion formed on the at least one of the front face or the rear face of the flywheel, wherein the recessed portion is formed having a ring shaped profile corresponding to a removed portion of a material of the flywheel containing a damage area, wherein the insert defines a machined surface coplanar with the at least one of the front face or the rear face of the flywheel.

2. The flywheel of claim 1, wherein a material of the insert is same as the material of the flywheel.

3. The flywheel of claim 1, wherein a material of the insert is different from the material of the flywheel.

4. The flywheel of claim 1, wherein the insert is coupled within the recessed portion using mechanical fasteners.

5. The flywheel of claim 1, wherein the insert has a ring shape.

6. An engine system comprising:
an engine block;
a crankshaft;
a clutch plate;
a gear member; and
a flywheel comprising:
a front face contacting with the clutch plate;
a rear face, the front and rear faces defining a thickness of the flywheel therebetween, and
at least one remanufactured surface formed on at least one of the front face or the rear face of the flywheel, wherein the at least one remanufactured surface has a planar configuration, the at least one remanufactured surface including:
an insert coupled within a recessed portion formed on the at least one of the front face or the rear face of the flywheel, wherein the recessed portion is formed having a ring shaped profile corresponding to a removed portion of a material of the flywheel containing a damage area, wherein the insert defines a machined surface coplanar with the at least one of the front face or the rear face of the flywheel.

7. The engine system of claim 6, wherein a material of the insert is same as the material of the flywheel.

8. The engine system of claim 6, wherein a material of the insert is different from the material of the flywheel.

9. The engine system of claim 6, wherein the insert is coupled within the recessed portion using mechanical fasteners.

10. The engine system of claim 6, wherein the insert has a ring shape.

* * * * *